United States Patent
Aratani et al.

(10) Patent No.: US 12,172,487 B2
(45) Date of Patent: Dec. 24, 2024

(54) ELECTRIC-RESISTANCE-WELDED STEEL PIPE FOR PRODUCING HOLLOW STABILIZER, HOLLOW STABILIZER, AND METHOD FOR PRODUCING SAME

(71) Applicant: JFE Steel Corporation, Tokyo (JP)

(72) Inventors: Masatoshi Aratani, Tokyo (JP); Ryoji Matsui, Tokyo (JP); Tomonori Kondo, Tokyo (JP); Shinsaku Kokubo, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 749 days.

(21) Appl. No.: 17/254,394

(22) PCT Filed: Apr. 24, 2019

(86) PCT No.: PCT/JP2019/017399
§ 371 (c)(1),
(2) Date: Dec. 21, 2020

(87) PCT Pub. No.: WO2020/003720
PCT Pub. Date: Jan. 2, 2020

(65) Prior Publication Data
US 2021/0268862 A1    Sep. 2, 2021

(30) Foreign Application Priority Data
Jun. 27, 2018   (JP) .................. 2018-121799

(51) Int. Cl.
*C21D 6/00* (2006.01)
*B21C 37/08* (2006.01)
(Continued)

(52) U.S. Cl.
CPC ........ *B60G 21/055* (2013.01); *B21C 37/0818* (2013.01); *B21D 7/025* (2013.01);
(Continued)

(58) Field of Classification Search
CPC ..... B21C 37/0818; B21D 7/025; B23K 11/08; C21D 8/10
See application file for complete search history.

(56) References Cited

U.S. PATENT DOCUMENTS

| 7,048,811 B2 | 5/2006 | Ohgami et al. |
| 10,415,110 B2 | 9/2019 | Wakabayashi et al. |
(Continued)

FOREIGN PATENT DOCUMENTS

| CN | 101182749 A | 5/2008 |
| CN | 105555976 A | 5/2016 |
(Continued)

OTHER PUBLICATIONS

Antonio, G., "Steel Forming and Heat Treating Handbook," Jan. 1, 2015, XP055779338, Retrieved from the Internet: https://www.researchgate.net/profile/Antonio-Gorni/publication/295399653_Steel_Forming_and_Heat_Treating_Handbook/links/56c9b7f608ae5488f0d90c36/Steel-Forming-and-Heat-Treating-Handbook.pdf [retrieved on Feb. 24, 2021], 2 pages.
(Continued)

*Primary Examiner* — Nicholas A Wang
(74) *Attorney, Agent, or Firm* — Buchanan Ingersoll & Rooney PC

(57) ABSTRACT

An electric resistance welded steel pipe for manufacturing a hollow stabilizer has a Lankford value in a pipe longitudinal direction of from 0.7 to less than 1.0. The electric resistance welded steel pipe is subjected to cold bending and then to a heat treatment including quenching and tempering to manufacture a stabilizer. The cold bending is cold rotary draw bending. When bent with a bend radius of from 1.0 times to 3.0 times an outer diameter of the pipe before cold bending, a flattening ratio is from 0% to 10%, a thickness reduction rate on a bending outside and a thickness increase rate on a bending inside are from 0% to 10%, and additionally, a (Continued)

circumferential length change of a bending center portion is from 0% to 10%. A Vickers hardness of the stabilizer after the heat treatment is adjusted to from 400 HV to less than 580 HV.

18 Claims, 3 Drawing Sheets

(51) Int. Cl.
  *B21D 7/025* (2006.01)
  *B23K 11/08* (2006.01)
  *B60G 21/055* (2006.01)
  *C21D 8/10* (2006.01)
  *C21D 9/08* (2006.01)
  *C21D 9/50* (2006.01)
  *C22C 38/00* (2006.01)
  *C22C 38/02* (2006.01)
  *C22C 38/04* (2006.01)
  *C22C 38/06* (2006.01)
  *C22C 38/24* (2006.01)
  *C22C 38/26* (2006.01)
  *C22C 38/42* (2006.01)
  *C22C 38/50* (2006.01)
  *C22C 38/54* (2006.01)

(52) U.S. Cl.
  CPC .............. *B23K 11/08* (2013.01); *C21D 6/004* (2013.01); *C21D 6/005* (2013.01); *C21D 6/008* (2013.01); *C21D 8/105* (2013.01); *C21D 9/08* (2013.01); *C21D 9/50* (2013.01); *C22C 38/002* (2013.01); *C22C 38/02* (2013.01); *C22C 38/04* (2013.01); *C22C 38/06* (2013.01); *C22C 38/24* (2013.01); *C22C 38/26* (2013.01); *C22C 38/42* (2013.01); *C22C 38/50* (2013.01); *C22C 38/54* (2013.01); *B60G 2202/135* (2013.01); *B60G 2206/012* (2013.01); *B60G 2206/427* (2013.01); *B60G 2206/724* (2013.01); *B60G 2206/8103* (2013.01); *B60G 2206/8402* (2013.01); *B60G 2206/8403* (2013.01)

(56) References Cited

U.S. PATENT DOCUMENTS

| | | |
|---|---|---|
| 2004/0131876 A1 | 7/2004 | Ohgami et al. |
| 2013/0098899 A1 | 4/2013 | Kawabata et al. |
| 2015/0176101 A1 | 6/2015 | Ishisuka et al. |
| 2017/0009321 A1 | 1/2017 | Balun et al. |
| 2018/0073096 A1 | 3/2018 | Wakabayashi et al. |
| 2018/0305780 A1 | 10/2018 | Aratani et al. |

FOREIGN PATENT DOCUMENTS

| | | | |
|---|---|---|---|
| CN | 108138279 A | | 6/2018 |
| EP | 2116623 A1 | | 11/2009 |
| EP | 3018220 A1 | | 5/2016 |
| EP | 3476953 A1 | | 5/2019 |
| JP | 2003201543 | * | 7/2003 |
| JP | 2003201543 A | | 7/2003 |
| JP | 2005076047 A | | 3/2005 |
| JP | 2006206999 | * | 8/2006 |
| JP | 2006206999 A | | 8/2006 |
| JP | 2009191330 A | | 8/2009 |
| JP | 2009249650 A | | 10/2009 |
| JP | 2010121157 A | | 6/2010 |
| JP | 2010274716 A | | 12/2010 |
| JP | 5287164 B2 | | 9/2013 |
| JP | 5303362 B2 | | 10/2013 |
| JP | 2013203309 A | | 10/2013 |
| JP | 2018095899 | * | 6/2018 |
| JP | 2018095899 A | | 6/2018 |
| WO | 02070767 A1 | | 9/2002 |
| WO | 2016152671 A1 | | 9/2016 |
| WO | 2017056384 A1 | | 4/2017 |
| WO | 2018079398 A1 | | 5/2018 |

OTHER PUBLICATIONS

Extended European Search Report for European Application No. 19 826 460.8, dated Mar. 4, 2021, 15 pages.
Chinese Office Action with Search Report for Chinese Application No. 201980042850.9, dated Jan. 19, 2022, 7 pages.
International Search Report and Written Opinion for International Application No. PCT/JP2019/017399, dated Jul. 30, 2019, 9 pages.
International Preliminary Report on Patentability for International Application No. PCT/JP2019/017399, dated Dec. 29, 2020, 12 pages.
Chinese Office Action with Search Report for Chinese Application No. 201980042850.9, dated Aug. 4, 2021, 12 pages.

* cited by examiner

ELECTRIC-RESISTANCE-WELDED STEEL PIPE FOR PRODUCING HOLLOW STABILIZER, HOLLOW STABILIZER, AND METHOD FOR PRODUCING SAME

This is the U.S. National Phase application of PCT/JP2019/017399, filed Apr. 24, 2019, which claims priority to Japanese Patent Application No. 2018-121799, filed Jun. 27, 2018, the disclosures of these applications being incorporated herein by reference in their entireties for all purposes.

FIELD OF THE INVENTION

The present invention is a technology relating to hollow stabilizers.

Here, in the present specification, Vickers hardness is represented by an average hardness in a thickness direction. The term "high strength" as used herein refers to a Vickers hardness of 400 HV or more, and preferably 450 HV or more.

BACKGROUND OF THE INVENTION

Usually, automobiles are mounted with a stabilizer to mitigate body roll during cornering and maintain running stability during traveling at high speed. Recently, to reduce body weight in automobiles, a hollow stabilizer using a steel pipe is commonly used as a stabilizer.

Such a hollow stabilizer is usually formed by a seamless steel pipe or an electric resistance welded steel pipe manufactured by electric resistance welding. Then, such a steel pipe is cold formed into a desired stabilizer shape, and then subjected to a thermal refining treatment including quenching and quenching-tempering to be formed into a product. Particularly, electric resistance welded steel pipes are widely used as a material for manufacturing a hollow stabilizer because of relatively low cost and excellent dimensional accuracy thereof.

Additionally, for example, a steel pipe disclosed in PTL 1 is a high-strength electric resistance welded steel pipe for a hollow member, which steel pipe is excellent in fatigue strength. PTL 1 states that fatigue characteristics are improved by specifying a steel material for a steel sheet forming the electric resistance welded steel pipe.

PATENT LITERATURE

PTL 1: JP Pat. No. 5287164

SUMMARY OF THE INVENTION

Shapes of stabilizers have become complicated to avoid interference with peripheral components, and stabilizers are often formed by bending with a small bend radius.

However, the steel pipe of PTL 1 may be insufficient in bendability and may not be able to be formed into a complicated stabilizer shape with a small curvature radius.

Aspects of the present invention have been made in view of the problem as described above, and it is an object according to aspects of the present invention to enable provision of a high-strength stabilizer excellent in bendability and fatigue characteristics even when using a hollow steel pipe as a stabilizer to reduce weight.

In a stabilizer, torsional fatigue characteristics are considered to be important. When twisted, the stabilizer has the highest stress at bending shoulders thereof. Investigation by the present inventors found that when bending a steel pipe to manufacture a stabilizer, as in the case of an electric resistance welded steel pipe, the cross-sectional shape of a bent portion of the bent steel pipe is flattened from a perfect circle upon bending of the steel pipe, whereby flattening ratio is increased, and a local stress concentration occurs, which shortens fatigue life. Additionally, the present inventors found that diameter reduction (shortened circumferential length) at the bent portion by bending also has the same negative influence.

Then, the present inventors have found that by setting tensile characteristics of an electric resistance welded steel pipe for manufacturing a hollow stabilizer, particularly, a Lankford value in a pipe axial direction within a specific range, flattening, increase and reduction in thickness, and circumferential length change in cold bending into a stabilizer shape can be suppressed to a small degree, as a result of which a stabilizer excellent in fatigue characteristics even with high strength can be provided.

Specifically, to solve the problem, one aspect according to aspects of the present invention is an electric resistance welded steel pipe for manufacturing a hollow stabilizer, which steel pipe has a Lankford value (r value) in a pipe longitudinal direction of from 0.7 to less than 1.0.

Additionally, a method for manufacturing a hollow stabilizer according to one aspect according to aspects of the present invention includes performing cold bending on the electric resistance welded steel pipe for manufacturing a hollow stabilizer according to the above one aspect, and then performing a heat treatment including quenching and tempering on the steel pipe, the cold bending being cold rotary draw bending, in which a bend radius of the bending is from 1.0 times to 3.0 times an outer diameter of the electric resistance welded steel pipe before performing the cold bending, a flattening ratio is from 0% to 10%, a thickness reduction rate on a bending outside and a thickness increase rate on a bending inside are from 0% to 10%, and a circumferential length change of a bending center portion is from 0% to 10%, and the Vickers hardness after the heat treatment being adjusted to from 400 HV to less than 580 HV.

According to the aspects of the present invention, even when using a hollow steel pipe as a stabilizer to reduce weight, there can be provided a high-strength stabilizer excellent in bendability and fatigue characteristics.

For example, according to the aspects of the present invention, a high-strength hollow stabilizer can be easily manufactured that has a lower limit of hardness HV of 400 HV and that is excellent in bendability and corrosion-fatigue resistant characteristics, so that industrially remarkable effects can be achieved. Additionally, according to the aspects of the present invention, even in a hollow stabilizer whose lower limit of hardness HV is further strengthened to 450 HV and whose bent portion has a small bend radius, no reduction in the fatigue characteristics is observed, so that there can be obtained an effect of contributing to further thinning of a stabilizer.

DETAILED DESCRIPTION OF EMBODIMENTS OF THE INVENTION

Hereinafter, embodiments of the present invention will be described with reference to the drawings.

Here, the drawings are schematic, and relationships between thicknesses and planar dimensions, distances between components, and the like are different from actual ones. Additionally, the following embodiments exemplify structures for embodying the technological ideas of aspects of the present invention, and the technological ideas of aspects of the present invention do not limit shapes, structures, and the like of the constituent components to those described below. Various changes can be made to the technological ideas of aspects of the present invention without departing from the technological scope defined by the claims described in CLAIMS.

The present embodiment relates to an electric resistance welded steel pipe suitable as a steel pipe that is formed into a hollow stabilizer for use in automobiles and other vehicles, as well as to a hollow stabilizer that is manufactured from the electric resistance welded steel pipe. Particularly, the present embodiment is a technology suitable to manufacture an electric resistance welded steel pipe capable of manufacturing a hollow stabilizer having high strength and improved fatigue characteristics and a high-strength hollow stabilizer.

The present embodiment is a technology particularly suitable to the high-strength hollow stabilizer that has a size (thickness/outer diameter) of 20% or less <Method for Manufacturing Electric Resistance Welded Steel Pipe 5 for Manufacturing Hollow Stabilizer>

Figure 1:
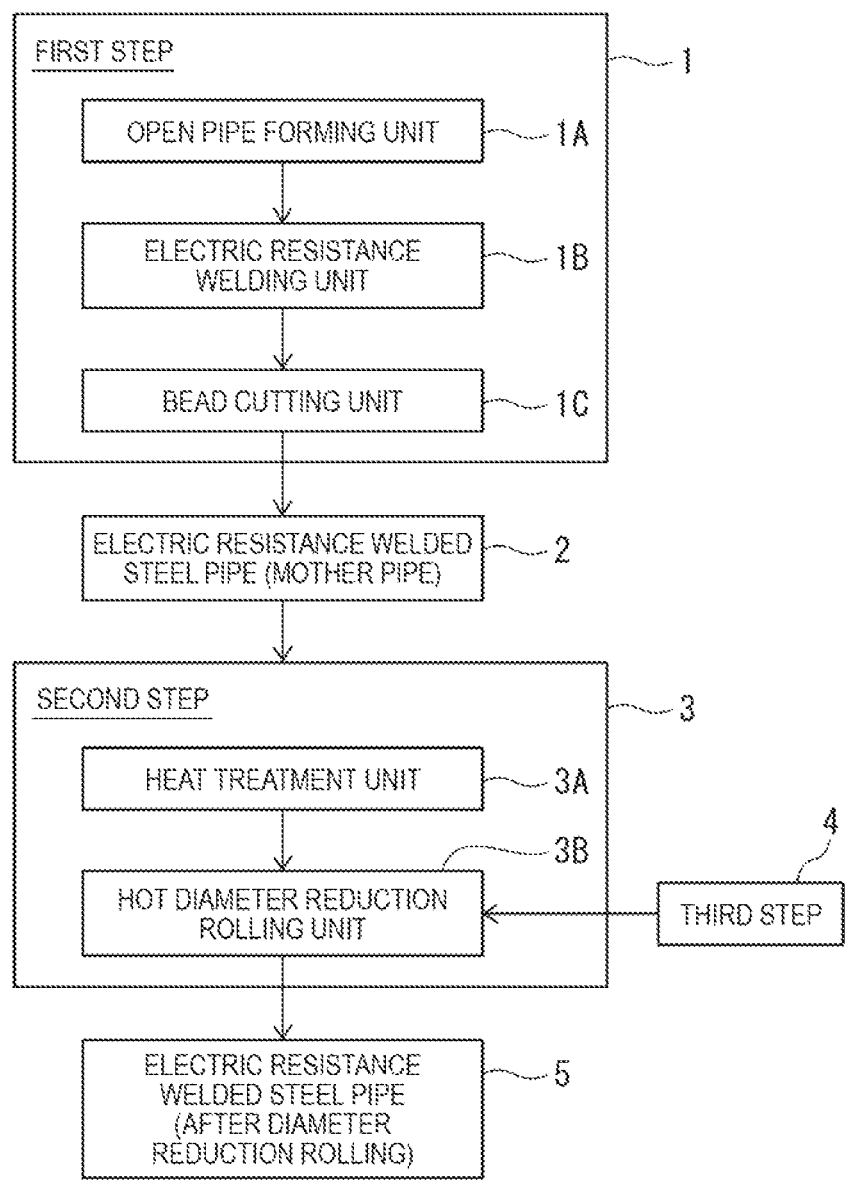
FIG. 1 is a block diagram illustrating a method for manufacturing an electric resistance welded steel pipe for manufacturing a hollow stabilizer according to an embodiment based on the present invention.

As illustrated in FIG. 1, a method for manufacturing an electric resistance welded steel pipe 5 for manufacturing a hollow stabilizer according to the present embodiment includes a first step 1 and a second step 3

(First Step 1)

Figure 2:
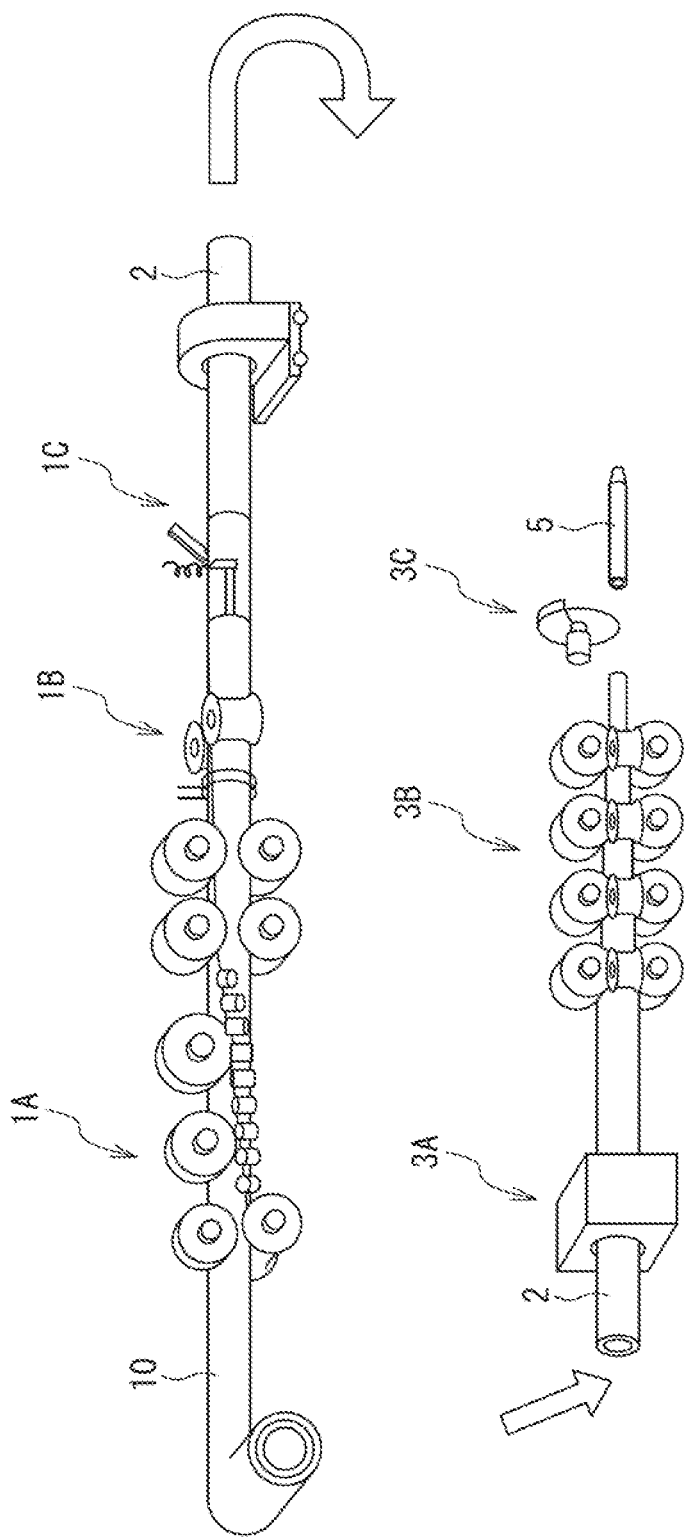
FIG. 2 is a conceptual diagram illustrating the method for manufacturing an electric resistance welded steel pipe for manufacturing a hollow stabilizer according to the embodiment based on the present invention.

The first step 1 is a step including an open pipe forming unit 1A that forms a steel sheet into a substantially cylindrical shape (a tubular shape) by cold forming to obtain an open pipe and an electric resistance welding unit 1B that butts widthwise end portions of the open pipe together and subjects the end portions to electric resistance welding to obtain an electric resistance welded steel pipe 2 as a mother pipe, as illustrated in FIG. 1 and FIG. 2.

As illustrated in FIG. 2, the open pipe forming unit 1A continuously performs cold forming, for example, by using a plurality of rolls to form a steel sheet into a substantially cylindrical open pipe.

The electric resistance welding unit 1B butts, for example, widthwise end portions of the open pipe together by a squeeze roll and subjects the end portions to electric resistance welding by high-frequency resistance welding, induction heating, or the like to obtain the electric resistance welded steel pipe 2 having a predetermined size.

Regarding the steel sheet used, FIG. 2 exemplifies a case where the sheet is in a state of a steel strip. The steel sheet is preferably a hot rolled steel sheet manufactured by hot rolling.

The first step 1 further includes a bead cutting unit 1C that cuts each of weld beads of the electric resistance welded steel pipe 2 generated on an outer surface side of the pipe and an inner surface side thereof due to the electric resistance welding, as a post treatment after the electric resistance welding unit 1B.

(Second Step 3)

As illustrated in FIG. 1 and FIG. 2, the second step 3 includes a heat treatment unit 3A that heats the electric resistance welded steel pipe 2 manufactured at the first step 1 and a hot diameter reduction rolling unit 3B that performs hot diameter reduction rolling on the heated electric resistance welded steel pipe 2 to obtain an electric resistance welded steel pipe 5. Reference sign 3C denotes a warm cutting treatment.

The heat treatment unit 3A performs a treatment for heating the electric resistance welded steel pipe 2 used as the mother pipe. The heating temperature is preferably from 850° C. to 1000° C. If the heating temperature is below 850° C., it may be impossible to secure a desired toughness on a welded portion. On the other hand, high temperatures exceeding 1000° C. may cause significant surface decarburization, which may degrade surface properties. Thus, the heating temperature is preferably a temperature ranging from 850° C. to 1000° C.

The hot diameter reduction rolling unit 3B performs a treatment for subjecting the electric resistance welded steel pipe 2 to hot diameter reduction rolling to obtain the electric resistance welded steel pipe 5. Conditions of the hot diameter reduction rolling are, for example, a rolling temperature: from 700° C. to 850° C. and a cumulative diameter reduction rate at an $Ar_3$ transformation point or lower: from 0% to 10%.

Here, if the rolling temperature at the time of hot diameter reduction rolling is below 700° C., workability is deteriorated, so that it may be difficult to form into a desired stabilizer shape. Additionally, the cumulative diameter reduction rate includes diameter reduction rates generated before and after the hot diameter reduction rolling.

Additionally, in the present embodiment, as conditions of the hot diameter reduction rolling, the hot diameter reduction rolling temperature is set within the range of from 700° C. to 850° C., and the cumulative diameter reduction rate at the $Ar_3$ transformation point or lower in the hot diameter reduction rolling is adjusted to 10% or less. In this way, a Lankford value (r value) in a pipe longitudinal direction of the obtained electric resistance welded steel pipe 5 for manufacturing a hollow stabilizer can be controlled to a range of from 0.7 to less than 1.0.

Here, when the cumulative diameter reduction rate at the $Ar_3$ transformation point or lower in the hot diameter reduction rolling is 10% or less, it is a cumulative diameter reduction rate in a state at the $Ar_3$ transformation point or lower in diameter reduction rolling of the hot diameter reduction rolling.

<Structure of Electric Resistance Welded Steel Pipe 5 for Manufacturing Hollow Stabilizer>

The electric resistance welded steel pipe 5 for manufacturing a hollow stabilizer according to the present embodiment is manufactured by, for example, the manufacturing method described above.

The electric resistance welded steel pipe 5 for manufacturing a hollow stabilizer according to the present embodiment is a steel pipe for manufacturing a hollow stabilizer and has a Lankford value (r value) in the pipe longitudinal direction of from 0.7 to less than 1.0.

In tensile characteristics of the electric resistance welded steel pipe 5 for manufacturing a hollow stabilizer, a yield ratio (YS/TS) of 0.7 or more and a uniform elongation U-EL of 10% or more are preferable.

When the yield ratio (YS/TS) is 0.7 or more and the uniform elongation U-EL is 10% or more, the flattening ratio of the bent portion can be suppressed to 10% or less.

The steel material forming the electric resistance welded steel pipe 5 is a steel material that has a Vickers hardness of 400 HV or more, and preferably, 450 HV or more. To obtain a hollow stabilizer having a Vickers hardness of 450 or more, preferably, the steel material includes, in terms of % by mass, C: from 0.20% to 0.40% by mass, Si: from 0.1% to 1.0%, Mn: from 0.1% to 2.0%, P: 0.100% or less, S: 0.010% or less, Al: from 0.01% to 0.10%, Cr: from 0.01% to 0.50%, Ti: from 0.01% to 0.05%, B: from 0.0005% to 0.0050%, Ca: from 0.0001% to 0.0050%, and N: 0.0050% or less, with a balance including Fe and inevitable impurities.

Preferably, the steel material forming the electric resistance welded steel pipe 5 further includes, in terms of % by mass, one or both of Cu: from 0.05% to 1.00% and Ni: from 0.05% to 1.00%.

In addition, preferably, the steel material forming the electric resistance welded steel pipe 5 further includes, in terms of % by mass, one or more selected from Nb: from 0.001% to 0.050%, W: from 0.001% to 0.050%, and V: from 0.05% to 0.50%.

Furthermore, preferably, the steel material forming the electric resistance welded steel pipe 5 further includes, in terms of % by mass, REM: from 0.001% to 0.020%.

(Reasons for Limiting Composition)

Next, reasons for limiting the composition of the electric resistance welded steel pipe 5 will be described. Hereinafter, "% by mass" is simply represented by "%", unless otherwise noted.

C: From 0.20% to 0.40%

C, which has an effect of promoting generation of martensite via improvement in hardenability and increasing strength (hardness) of steel by solid solution, is an important element for increasing the strength of the hollow stabilizer. In the present embodiment, to set the hardness after quenching and tempering to a Vickers hardness of 400 HV or more, a C content of 0.20% or more is required. On the other hand, if a large amount of C exceeding 0.40% is contained, toughness after quenching is reduced, and quench cracking easily occurs in the heat treatment after forming into a hollow stabilizer.

Therefore, C is limited to the range of from 0.20% to 0.40%. Additionally, preferably, C is 0.22% or more, and preferably 0.39% or less.

Si: From 0.1% to 1.0%

Si acts as a deoxidizing agent, as well as acts as a solid solution strengthening element. To obtain such effects, a Si content of 0.1% or more is required. On the other hand, if the Si content exceeds 1.0%, electric resistance weldability is reduced. Therefore, the Si content is limited to the range of from 0.1% to 1.0%. In addition, preferably, the Si content is 0.5% or less.

Mn: From 0.1% to 2.0%

Mn is an element that forms a solid solution to contribute to increase in the strength of steel and that improves the hardenability of steel. In the present embodiment, to secure a desired high strength (high hardness), a Mn content of 0.1% or more is required. On the other hand, if the Mn content exceeds 2.0%, the toughness is reduced, which increases a risk of quench cracking. Therefore, the Mn content is limited to the range of from 0.1% to 2.0%. In addition, preferably, the Mn content is 0.5% or more and preferably 1.8% or less.

P: From 0.100% or Less

P is an element that is present as an impurity, segregates at grain boundaries and the like, and negatively affects weld crackability and toughness. To be used for a hollow stabilizer, P content is required to be reduced to 0.100% or less. Additionally, the P content is preferably 0.050% or less. Note that since P is inevitably contained, the P content is usually 0.001% or more.

S: 0.010% or Less

S is an element that is present as a sulfide-based inclusion in steel and reduces hot workability, toughness, and fatigue resistant characteristics. To be used for a hollow stabilizer, S content is required to be reduced to 0.01% or less. In addition, the S content is preferably 0.005% or less. Note that since S is inevitably contained, the S content is usually 0.001% or more.

Al: From 0.01% to 0.10%

Al acts as a deoxidizing agent, and has an effect of securing an amount of solid solution B effective in improving hardenability by binding to N. Additionally, Al precipitates as AlN, and has an effect of preventing austenite grains from coarsening during quenching and heating. To obtain such an effect, an Al content of 0.01% or more is required. On the other hand, if a large amount of Al exceeding 0.10% is contained, amounts of oxide-based inclusions are increased, which may reduce the fatigue life. Therefore, the Al content is limited to the range of from 0.01% to 0.10%. Additionally, the Al content is preferably 0.05% or less.

Cr: From 0.01% to 0.50%

Cr is an element that improves the hardenability of steel and contributes to improvement in corrosion resistance. To obtain such effects, a Cr content of 0.01% or more is required. On the other hand, if the Cr content exceeds 0.50%, electric resistance weldability is reduced. Therefore, the Cr content is limited to the range of from 0.01% to 0.50%. In addition, the Cr content is preferably 0.10% or more and preferably 0.30% or less.

Ti: From 0.01% to 0.05%

Ti combines with N and has an effect of securing an amount of solid solution B effective in improving hardenability. Additionally, Ti precipitates as fine carbides, contributes to refinement of austenite grains during a heat treatment such as quenching, and contributes to improvement in fatigue resistant characteristics (corrosion-fatigue resistant characteristics) in corrosive environments. To obtain such effects, a Ti content of 0.01% or more is required. On the other hand, if the Ti content exceeds 0.05%, coarse titanium sulfide (TiS) tends to be formed, which easily becomes a starting point of corrosion pits, so that corrosion resistance and corrosion-fatigue resistant characteristics are deteriorated. Therefore, the Ti content is limited to the range of from 0.01% to 0.05%. In addition, the Ti content is preferably 0.04% or less.

B: From 0.0005% to 0.0050%

B is an element effective in improving the hardenability of steel even with a small content thereof. Additionally, B acts to strengthen grain boundaries and suppress grain boundary embrittlement due to P segregation. To obtain such effects, a B content of 0.0005% or more is required. On the other hand, if the B content exceeds 0.0050%, the effects are saturated, which is economically disadvantageous. Therefore, the B content is limited to the range of from 0.0005% to 0.0050%. Additionally, the B content is preferably 0.0010% or more and preferably 0.0030% or less.

Ca: From 0.0001% to 0.0050%

Ca is an element that has an effect of controlling the form of sulfide-based inclusions to minute and substantially spherical inclusions. Since coarse MnS particles have a risk of becoming starting points of fatigue fracture, Ca is added to suppress generation of MnS. To obtain such an effect, a Ca content of 0.0001% or more is required. On the other hand, if the Ca content becomes large and exceeds 0.0050%, coarse CaS-based clusters excessively increase, and rather become starting points of fatigue cracks, due to which fatigue characteristics are deteriorated. Therefore, the Ca content is limited to the range of from 0.0001% to 0.0050%. Additionally, the Ca content is preferably 0.0010% or more and preferably 0.0030% or less.

N: 0.0050% or Less

N is inevitably contained as an impurity. N combines with a nitride forming element in steel and contributes to suppression of coarsening of crystal grains and furthermore to increase in strength after tempering. However, if N content exceeds 0.0050%, the toughness of a welded portion is reduced. Therefore, the N content is limited to 0.0050% or less. Additionally, the N content is preferably 0.001% or less, and more preferably 0.0003% or less. Note that since N is inevitably contained, the N content is usually 0.0001% or more.

One or Two Selected from Cu: From 0.05% to 1.00% and Ni: From 0.05% to 1.00%

Cu and Ni are elements that both improve hardenability and both improve corrosion resistance, and that can be contained by selecting when necessary. To obtain such effects, a Cu content of 0.05% or more and an Ni content of 0.05% or more are required. On the other hand, both Cu and Ni are expensive elements, and if Cu and Ni, respectively, are contained in amounts exceeding 1.00%, material cost is increased. Therefore, when Cu and Ni are contained, it is preferable to limit to Cu: 1.00% or less and Ni: 1.00% or less. It is also preferable to limit to Cu: 0.05% or more and Ni: 0.05% or more. Additionally, more preferred are Cu: 0.10% or more and Ni: 0.10% or more. More preferred are Cu: 0.50% or less and Ni: 0.50% or less.

One or More Selected from Nb: From 0.001% to 0.050%, W: From 0.001% to 0.050%, and V: From 0.05% to 0.50%

Nb, W, and V are elements that all form fine carbides and contribute to increase in strength (hardness), and one or more thereof can be contained by selecting when necessary. To obtain such an effect, it is necessary to contain Nb: 0.001% or more, W: 0.01% or more, and V: 0.05% or more, respectively. On the other hand, even if Nb, W, and V are contained in amounts exceeding Nb: 0.050%, W: 0.050%, and V: 0.50%, the effect saturates, and it is impossible to expect any effect worth the contents, which is economically disadvantageous. Additionally, the carbides are easily coarsened and negatively affect the toughness. Therefore, when Nb, W, and V are contained, it is preferable to limit to Nb: 0.050% or less, W: 0.050% or less, and V: 0.50% or less, respectively. In addition, more preferred are Nb: 0.010% or more, W: 0.010% or more, and V: 0.10% or more. More preferred are Nb: 0.030% or less, W: 0.030% or less, and V: 0.30% or less.

REM: From 0.001% to 0.020%

REM is an element that has an effect of controlling the form of sulfide-based inclusions to minute and substantially spherical inclusions, similarly to Ca. In the present embodiment, from the viewpoint of complementing the effect of Ca, REM is desirably contained in an amount of 0.001% or more. On the other hand, if REM content exceeds 0.020%, amounts of the inclusions are excessively increased, and rather become starting points of fatigue fracture, due to which fatigue characteristics are deteriorated. Therefore, the REM content is preferably limited to 0.020% or less. Additionally, more preferred is REM: 0.005% or more. More preferred is REM: 0.010% or less.

<Effects of Electric Resistance Welded Steel Pipe 5 for Manufacturing Hollow Stabilizer>

The present embodiment can provide a high-strength hollow stabilizer excellent in bendability and fatigue characteristics by employing the electric resistance welded steel pipe 5 for manufacturing a hollow stabilizer.

For example, according to the present embodiment, a high-strength hollow stabilizer can be easily manufactured that has a lower limit of hardness HV of 400 HV and that is excellent in bendability and corrosion-fatigue resistant characteristics, whereby industrially remarkable effects can be achieved. In addition, for example, according to the present embodiment, even in a hollow stabilizer whose lower limit of the hardness HV is further strengthened to 450 HV and whose bent portion has a small bend radius, no deterioration in the fatigue characteristics is observed, so that there can also be obtained an effect of contributing to further thinning of a stabilizer.

Additionally, in this case, the steel material forming the steel pipe may include, in terms of % by mass, C: from 0.20% to 0.40%, Si: from 0.1% to 1.0%, Mn: from 0.1% to 2.0%, P: 0.100% or less, S: 0.010% or less, Al: from 0.01% to 0.10%, Cr: from 0.01% to 0.50%, Ti: from 0.01% to 0.05%, B: from 0.0005% to 0.0050%, Ca: from 0.0001% to 0.0050%, and N: 0.0050% or less, with a balance including Fe and inevitable impurities.

According to the present embodiment, employing the above structure can ensure that a manufactured hollow stabilizer has a hardness of from 400 HV to less than 580 HV, so that there can be provided a high-strength hollow stabilizer excellent in fatigue characteristics.

<Hollow Stabilizer>

Figure 3:
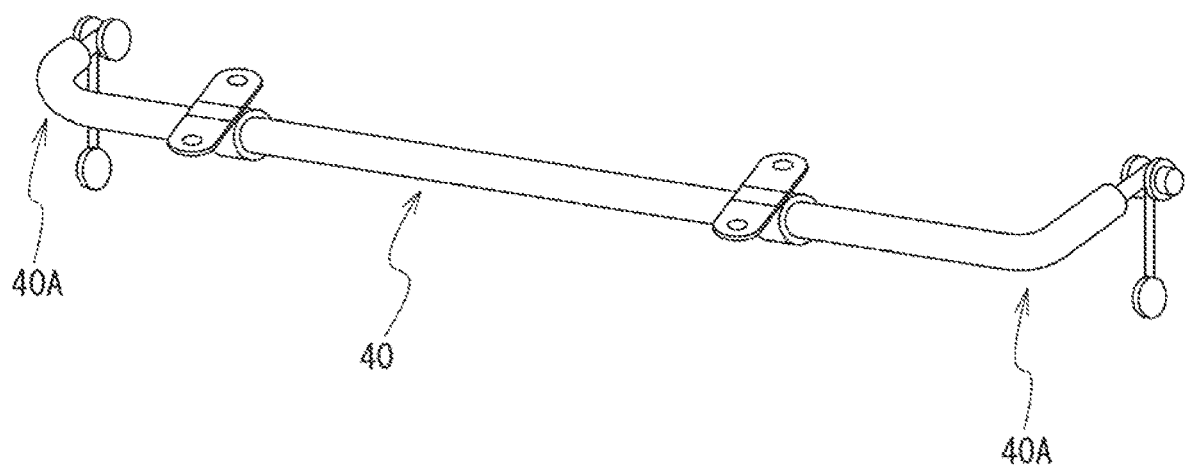
FIG. 3 is a diagram illustrating an example of a shape of a hollow stabilizer.

A hollow stabilizer 40 of the present embodiment is a hollow stabilizer that is formed by cold bending the electric resistance welded steel pipe 5 for manufacturing a hollow stabilizer described above into a shape as illustrated in FIG. 3 and that has a Vickers hardness of from 400 HV to less than 580 HV. In FIG. 3, a portion denoted by reference sign 40A is an example of the bent portion.

The hollow stabilizer includes, for example, a forming step of performing bend forming on the electric resistance welded steel pipe 5 for manufacturing a hollow stabilizer described above and a heat treatment step of performing a heat treatment including quenching or quenching and tempering after the forming step. The hollow stabilizer is manufactured by adjusting the hardness after the heat treatment to a Vickers hardness of from 400 HV to less than 580 HV by the heat treatment of the heat treatment step. Furthermore, shot blasting may be performed on an inner surface of the pipe, an outer surface thereof, or the inner and outer surfaces thereof.

In the forming step, the steel pipe 5 is bent formed into a desired stabilizer shape. As the forming method, any known forming method is applicable. The treatment in the forming step is preferably cold bending, from the viewpoint of suppression of surface decarburization.

Furthermore, the present embodiment uses rotary draw bending as the cold bending.

In the present embodiment, cold rotary draw bending is performed to bend to a bend radius selected from a range of bend radiuses of, for example, from 1.0 times to 3.0 times an outer diameter of the electric resistance welded steel pipe 5 before cold bending. Additionally, in the present embodiment, a flattening ratio when bent with the bend radius is set to from 0% to 10%. Furthermore, in the present embodiment, a thickness reduction rate on a bending outside and a thickness increase rate on a bending inside are controlled to from 0% to 10%, and a circumferential length change of a bending center portion is controlled to from 0% to 10%.

The above-mentioned bending curvature, flattening ratio, thickness reduction/increase rate, and circumferential length change rate are defined by the following equations:

Bending curvature=bend radius $R$/steel pipe outer diameter $D$

Flattening ratio={(major diameter−minor diameter)/ original diameter}×100

Thickness reduction/increase rate={((bending inside or bending outside)thickness−original thickness)/original thickness}×100

Circumferential length change rate={(circumferential length of bending center portion−original circumferential length)/original circumferential length}×100

Here, a smaller flattening ratio is preferable to suppress stress concentration. Then, when the flattening ratio exceeds 10%, the durable life becomes short due to local stress concentration. Therefore, in the present embodiment, the flattening ratio is set to from 0% to 10%. In addition, it has been confirmed that when bending to a bend radius of from 1.0 times to 3.0 times the outer diameter before bending, the flattening ratio can be controlled to from 0% to 10%.

It is also desirable that both the thickness reduction on the bending outside and the thickness increase on the bending inside are small. If both of them exceed 10%, there occur stress concentration onto a thin portion and a local stress concentration due to an uneven stress balance on the entire bent portion, resulting in a shortened durable life. Therefore, the thickness reduction rate on the bending outside and the thickness increase rate on the bending inside are both set to be from 0% to 10%.

Furthermore, if the Lankford value (r value) is too large, the circumferential length of the bent portion becomes short and the diameter becomes small. Accordingly, it is preferable that the circumferential length change of the bent portion is small. If the circumferential length becomes short and exceeds 10%, stress generated at the bent portion becomes large, so that the durable life is shortened. Therefore, the circumferential length change of the bending center portion is set to be from 0% to 10%.

In addition, when the steel pipe is pulled in the axis direction, two deformations occur in the steel pipe with a certain ratio, one of which is a deformation due to diameter reduction in a circumferential direction and the other one of which is a deformation due to thickness reduction in a thickness direction. In this case, when the r value in the pipe axis direction of the steel pipe is high, a rate of the deformation due to diameter reduction in the circumferential direction tends to be large, whereas a rate of the deformation due to thickness reduction in the thickness direction tends to be small, upon pulling of the steel pipe. In other words, the steel pipe is hard to be thinned, and extends like a candy while the diameter is being reduced.

Here, when manufacturing a stabilizer, the steel pipe is bent formed. At that time, the bending outside is subjected to tensile deformation that is the same as the tension of the steel pipe, whereas the bending inside is subjected to compressive deformation that is opposite to that.

Thus, in the steel pipe, when the r value in the pipe axis direction is high, the thickness of the bending outside is hardly reduced, whereas the thickness of the bending inside is hardly increased. On the other hand, the diameter of the steel pipe is reduced. In other words, the circumferential length of the steel pipe becomes short.

Considering those above, the present embodiment adjusts the r value in the pipe axis direction to be from 0.7 to less than 1.0.

Here, if the r value in the pipe axis direction is less than 0.7, the thickness reduction on the bending outside and the thickness increase on the bending inside become large, so that locally concentrated stress is generated over time due to use, which may shorten fatigue life. On the other hand, if the r value is 1.0 or more, the circumferential length of the pipe becomes short, so that the stress occurring at the bent portion becomes high, which may shorten the life.

The heat treatment step includes a heat treatment including quenching and tempering.

The quenching is preferably performed by heating the steel pipe to a temperature of an $Ac_3$ transformation point or higher, preferably to a temperature of 1100° C. or lower, maintaining for a predetermined time, preferably one second or longer, and then placing in a quenching tank to quench at a cooling rate of, for example, from 10° C./s to 100° C./s. As a result, the hollow stabilizer of the present embodiment can have high strength and high toughness.

If the quenching heating temperature becomes a high temperature exceeding 1100° C., the austenite grains become coarse. Note that the heating is preferably electric heating from the viewpoint of suppression of surface decarburization and productivity. In addition, the refrigerant in the quenching tank is preferably water, quenching oil, or a mixed solution of water and a polymer having an adjusted concentration.

Preferably, tempering is further performed after the quenching. In the tempering, tempering temperature is preferably adjusted according to a desired hardness. The tempering temperature is preferably from 200° C. to 450° C. Performing the tempering significantly improves the toughness.

Obviously, after the heat treatment, it is preferable to perform ordinary shot blasting on the inner surface of the pipe, the outer surface thereof, or the inner and outer surfaces thereof to improve fatigue resistant characteristics.

Then, the hardness after the heat treatment is set to a high strength of from 400 HV to less than 580 HV in Vickers hardness.

Here, in the present embodiment, the term "high strength" is defined to mean that an average hardness in the thickness direction is a lower limit of hardness HV of 400 HV, and preferably a lower limit of hardness HV of 450 HV, in Vickers hardness. Note that if the average hardness in the thickness direction is 580 HV or more, the toughness is significantly reduced, and therefore, upper limit is set to less than 580 HV is set.

Additionally, the expression "excellent in fatigue characteristics" used herein is defined to mean that, in a fatigue test (under completely reversed stress) with a load stress of ±400 MPa, the number of cycles to cause cracking is 200,000 or more.

As described above, the hollow stabilizer of the present embodiment is a high-strength stabilizer having an HV hardness after refining of 400 or more and excellent in fatigue characteristics since the flatness is small even when the bend radius of the bent shoulder portion of the stabilizer is small. Thus, the hollow stabilizer is suitable as a stabilizer, and can therefore contribute to hollowing (weight reduction).

EXAMPLE

Next, an Example based on the present embodiment will be described.

Table 1 shows compositions of hot-rolled steel sheets used in the present Example.

TABLE 1

| Steel No. | C | Si | Mn | P | S | Al | Ti | Cr | B | N | Ca | Cu, Ni | Nb, V, W | REM |
|---|---|---|---|---|---|---|---|---|---|---|---|---|---|---|
| A | 0.40 | 0.15 | 1.25 | 0.013 | 0.001 | 0.035 | 0.035 | 0.15 | 0.0025 | 0.0021 | 0.0015 | — | — | — |
| B | 0.36 | 0.12 | 1.24 | 0.015 | 0.001 | 0.032 | 0.034 | 0.15 | 0.0022 | 0.0025 | 0.0011 | — | — | — |
| C | 0.26 | 0.11 | 1.25 | 0.016 | 0.001 | 0.035 | 0.036 | 0.15 | 0.0018 | 0.0018 | 0.0013 | — | — | — |
| D | 0.22 | 0.15 | 0.55 | 0.012 | 0.001 | 0.036 | 0.015 | 0.25 | 0.0015 | 0.0022 | 0.0015 | — | — | — |
| E | 0.35 | 0.15 | 1.35 | 0.015 | 0.001 | 0.035 | 0.035 | 0.11 | 0.0012 | 0.0025 | 0.0015 | Cu 0.15, Ni 0.12 | — | — |
| F | 0.35 | 0.15 | 1.35 | 0.015 | 0.001 | 0.035 | 0.035 | 0.11 | 0.0012 | 0.0025 | 0.0015 | — | Nb 0.015 | — |
| G | 0.26 | 0.15 | 1.35 | 0.015 | 0.001 | 0.035 | 0.015 | 0.11 | 0.0012 | 0.0025 | 0.0015 | — | V 0.05 | — |
| H | 0.35 | 0.15 | 1.35 | 0.015 | 0.001 | 0.035 | 0.035 | 0.11 | 0.0012 | 0.0025 | 0.0015 | — | W 0.05 | — |
| I | 0.35 | 0.15 | 1.35 | 0.015 | 0.001 | 0.035 | 0.025 | 0.11 | 0.0012 | 0.0025 | 0.0015 | — | — | 0.001 |
| J | 0.45 | 0.12 | 1.24 | 0.015 | 0.001 | 0.032 | 0.034 | 0.15 | 0.0022 | 0.0025 | 0.0011 | — | — | — |
| K | 0.16 | 0.12 | 1.24 | 0.015 | 0.001 | 0.032 | 0.034 | 0.15 | 0.0022 | 0.0025 | 0.0011 | — | — | — |
| L | 0.35 | 0.12 | 1.24 | 0.015 | 0.001 | 0.032 | 0.034 | 0.15 | — | 0.0025 | 0.0011 | — | — | — |
| M | 0.35 | 0.12 | 1.24 | 0.015 | 0.001 | 0.032 | 0.034 | — | 0.0015 | 0.0025 | 0.0011 | — | — | — |
| N | 0.35 | 0.12 | 1.24 | 0.015 | 0.001 | 0.032 | 0.005 | 0.12 | 0.0015 | 0.0025 | 0.0011 | — | — | — |
| O | 0.36 | 0.12 | 1.24 | 0.015 | 0.001 | 0.032 | 0.034 | 0.15 | 0.0022 | 0.0025 | — | — | — | — |
| P | 0.36 | 0.12 | 1.24 | 0.015 | 0.012 | 0.032 | 0.034 | 0.15 | 0.0022 | 0.0025 | 0.0015 | — | — | — |

In the present Example, each hot-rolled steel sheet (sheet thickness: 4.3 mm) was cold formed continuously by a plurality of rolls to form a substantially cylindrical open pipe. Then, circumferential end portions of the open pipe were butted and pressed against each other and subjected to electric resistance welding using a high-frequency electric resistance welding method to form an electric resistance welded steel pipe 2 (outer diameter 89.1 mmϕ×thickness 4.3 mm).

Additionally, the obtained electric resistance welded steel pipe 2 was heated to a heating temperature shown in Table 2, and then subjected to a diameter reduction rolling step of performing diameter reduction rolling at a diameter reduction rate shown in Table 2 by a stretch reducer to obtain an electric resistance welded steel pipe 5 with dimensions (outer diameter 25.4 mmϕ×thickness 4.0 mm) shown in Table 2. The obtained steel pipe 5 was used as a material for manufacturing a hollow stabilizer.

Then, as shown in Table 2, the present Example produced 21 electric resistance welded steel pipes 5 (pipe Nos. 1 to 21) for manufacturing 21 hollow stabilizers.

Table 2 additionally shows measured values of tensile characteristics of the electric resistance welded steel pipe 5 for manufacturing each hollow stabilizer.

In addition, the electric resistance welded steel pipe 5 for manufacturing each hollow stabilizer was bent into an L shape by rotary draw bending to form each test sample imitating a hollow stabilizer. In this case, bending conditions and heat treatment conditions of quenching and tempering shown in Table 2 were applied.

Here, the bending was cold rotary draw bending, and the bent portion of the electric resistance welded steel pipe 5 formed into the L shape was one bent with a bend radius of 1.5 times the outer diameter.

In addition, in the quenching, the outer surface of the steel pipe 5 was electrically heated to a heating temperature shown in Table 2, and then the steel pipe 5 was immersed in a water tank. After the quenching, tempering was performed by maintaining the steel pipe 5 at a temperature shown in Table 2 for 20 minutes. After that, shot blasting was applied to the outer surface by a steel ball to produce an L-shaped test piece having each of pipe Nos. 1 to 21, and the test pieces were used as specimens for a torsional fatigue test.

Furthermore, a hardness measurement piece was collected from each specimen before the shot blasting to perform hardness measurement. The hardness was measured on a cross section (C cross section) perpendicular to the pipe axis direction of the steel pipe by using a Vickers hardness meter (load: 500 gf (4.9 N)) at a pitch of 0.1 mm from the outer surface of the pipe to the inner surface thereof in the thickness direction.

Furthermore, in the torsional fatigue test, a fatigue test (under completely reversed stress) was performed with a load stress of ±400 MPa at a place where a maximum stress was generated (a position at approximately 60 degrees in the pipe circumferential direction from the bending inside) to investigate the number of cycles to cause cracking. Note that test conditions were a load stress of ±400 MPa (completely reversed stress) and a frequency of 1 Hz.

Table 2 shows obtained results.

TABLE 2

| Pipe No. | Steel No. | Before diameter reduction Outer diameter (mm) | Before diameter reduction Thickness (mm) | After diameter reduction Outer diameter (mm) | After diameter reduction Thickness (mm) | Heating temperature before diameter reduction rolling (°C) | Rolling end temperature (°C) | Cumulative diameter reduction rate at Ar3 transformation point or lower (%) | Tensile characteristics YS (MPa) | TS (MPa) | YS/TS (%) | EL (%) | u-EL (%) | r value in pipe longitudinal direction | Cold bending Bending outside thickness reduction rate (%) | Bending inside thickness increase rate (%) | Flattening ratio (%) | Circumferential length change rate of bending center (%) | Heat treatment Quenching electric heating temperature (°C) | Tempering temperature (°C) | HV hardness after heat treatment | Outer surface shot blasting | Durable life in fatigue test ×10000 (σ = 400 MPa) |
|---|---|---|---|---|---|---|---|---|---|---|---|---|---|---|---|---|---|---|---|---|---|---|---|
| 1 | A | 89.1 | 4.3 | 25.4 | 4.0 | 980 | 800 | 0.0 | 550 | 760 | 72 | 26 | 15 | 0.9 | 6 | 6 | 7 | 7 | 900 | 300 | 520 | Done | 35 cycles |
| 2 | B | 89.1 | 4.3 | 25.4 | 4.0 | 960 | 780 | 0.0 | 516 | 713 | 72 | 33 | 18.0 | 0.9 | 6 | 5 | 6 | 7 | 900 | 260 | 500 | Done | 31 cycles |
| 3 | C | 89.1 | 4.3 | 25.4 | 4.0 | 980 | 780 | 0.0 | 490 | 640 | 77 | 36 | 22.0 | 0.7 | 6 | 7 | 7 | 6 | 900 | 250 | 470 | Done | 28 cycles |
| 4 | D | 89.1 | 4.3 | 25.4 | 4.0 | 960 | 770 | 5.0 | 394 | 536 | 74 | 47 | 26.0 | 0.8 | 6 | 6 | 8 | 8 | 900 | 300 | 440 | Done | 25 cycles |
| 5 | E | 89.1 | 4.3 | 25.4 | 4.0 | 980 | 760 | 0.0 | 510 | 720 | 71 | 32 | 16.0 | 0.8 | 5 | 6 | 6 | 6 | 900 | 260 | 500 | Done | 30 cycles |
| 6 | F | 89.1 | 4.3 | 25.4 | 4.0 | 970 | 780 | 0.0 | 510 | 705 | 72 | 30 | 18.0 | 0.8 | 6 | 6 | 5 | 5 | 900 | 260 | 500 | Done | 31 cycles |
| 7 | G | 89.1 | 4.3 | 25.4 | 4.0 | 960 | 800 | 0.0 | 480 | 630 | 76 | 34 | 20.0 | 0.8 | 6 | 6 | 7 | 7 | 900 | 260 | 500 | Done | 30 cycles |
| 8 | H | 89.1 | 4.3 | 25.4 | 4.0 | 960 | 800 | 0.0 | 520 | 702 | 74 | 34 | 19.0 | 0.8 | 7 | 6 | 8 | 6 | 900 | 260 | 500 | Done | 29 cycles |
| 9 | I | 89.1 | 4.3 | 25.4 | 4.0 | 920 | 780 | 0.0 | 536 | 730 | 73 | 32 | 16.0 | 0.8 | 6 | 6 | 6 | 6 | 900 | 260 | 500 | Done | 32 cycles |
| 10 | J | 89.1 | 4.3 | 25.4 | 4.0 | 950 | 800 | 0.0 | 580 | 789 | 74 | 20 | 8.0 | 0.9 | 6 | 6 | 6 | 6 | 900 | 250 | 590 | Done | 5 cycles |
| 11 | K | 89.1 | 4.3 | 25.4 | 4.0 | 980 | 790 | 0.0 | 350 | 480 | 73 | 47 | 26.0 | 0.9 | 6 | 7 | 7 | 6 | 900 | 280 | 380 | Done | 10 cycles |
| 12 | L | 89.1 | 4.3 | 25.4 | 4.0 | 980 | 790 | 0.0 | 490 | 687 | 71 | 36 | 19.0 | 0.9 | 6 | 6 | 8 | 7 | 900 | 260 | 380 | Done | 10 cycles |
| 13 | M | 89.1 | 4.3 | 25.4 | 4.0 | 980 | 850 | 0.0 | 510 | 702 | 73 | 30 | 16.0 | 0.9 | 5 | 6 | 6 | 6 | 900 | 260 | 390 | Done | 11 cycles |
| 14 | N | 89.1 | 4.3 | 25.4 | 4.0 | 980 | 750 | 0.0 | 500 | 687 | 73 | 32 | 17.0 | 0.9 | 6 | 6 | 7 | 6 | 900 | 260 | 280 | Done | 7 cycles |
| 15 | O | 89.1 | 4.3 | 25.4 | 4.0 | 980 | 720 | 5.0 | 516 | 708 | 73 | 35 | 18.0 | 0.9 | 6 | 6 | 5 / 6 | 7 | 900 | 260 | 490 | Done | 15 cycles |
| 16 | P | 89.1 | 4.3 | 25.4 | 4.0 | 980 | 750 | 0.0 | 500 | 700 | 71 | 33 | 17.0 | 1.0 | 6 | 6 | 6 | 6 | 900 | 260 | 500 | Done | 11 cycles |
| 19 | B | 89.1 | 4.3 | 25.4 | 4.0 | 1080 | 860 | 0.0 | 509 | 690 | 74 | 34 | 26.0 | 0.6 | 12 | 13 | 13 | 2 | 900 | 260 | 500 | Done | 12 cycles |

TABLE 2-continued

| Pipe No. | Steel No. | Before diameter reduction Outer diameter (mm) | Before diameter reduction Thickness (mm) | After diameter reduction Outer diameter (mm) | After diameter reduction Thickness (mm) | Heating temperature before diameter reduction rolling (°C) | Rolling end temperature (°C) | Cumulative diameter reduction rate at Ar3 transformation point or lower (%) | Tensile characteristics YS (MPa) | TS (MPa) | YS/TS (%) | EL (%) | u-EL (%) | r value in pipe longitudinal direction | Cold bending Bending outside thickness reduction rate (%) | Bending inside thickness increase rate (%) | Flattening ratio (%) | Circumferential length change rate of bending center (%) | Heat treatment Quenching electric heating temperature (°C) | Tempering temperature (°C) | HV hardness after heat treatment | Outer surface shot blasting | Durable life in fatigue test ×10000 (σ = 400 MPa) |
|---|---|---|---|---|---|---|---|---|---|---|---|---|---|---|---|---|---|---|---|---|---|---|---|
| 20 | B | 89.1 | 4.3 | 25.4 | 4.0 | 830 | 700 | 15.0 | 600 | 750 | 80 | 28 | 9.0 | 1.1 | 5 | 6 | 4 | 12 | 900 | 260 | 500 | Done | 11 cycles |
| 21 | B | 89.1 | 4.3 | 25.4 | 4.0 | 870 | 680 | 30.0 | 625 | 760 | 82 | 23 | 9 | 1.2 | 4 | 4 | 4 | 14 | 900 | 260 | 500 | Done | 8 cycles |

As can be seen from Table 2, in pipe Nos. 1 to 9 based on aspects of the present invention, the hardness after the quenching and the tempering can be 400 HV or more by controlling the Lankford value of the electric resistance welded steel pipe 5 to be from 0.7 to less than 1.0, so that the specimens have high strength (high hardness). Furthermore, in pipe Nos. 1 to 9 based on aspects of the present invention, the number of cycles to fracture in the fatigue test are 200,000 or more, which indicates that a high-strength hollow stabilizer excellent in bendability and fatigue characteristics can be manufactured.

On the other hand, in a comparison between pipe No. 2 and pipe Nos. 19 to 21, even though the steel material used is the same and the hardness after the heat treatment is equally a high strength of 500 HV, the number of cycles to fracture in the fatigue test is less than 200,000 when the Lankford value of the electric resistance welded steel pipe 5 is outside the range according to aspects of the present invention, as in pipe Nos. 19 to 21. This shows that setting the Lankford value of the electric resistance welded steel pipe 5 within the range according to aspects of the present invention enables obtaining of a hollow stabilizer excellent in bendability and fatigue characteristics when the strength is equally high.

Here, the strength of pipe No. 10 was 590 HV, due to which toughness was reduced and durability was deteriorated. In other words, in pipe No. 10, since the hardness of the final product was forcibly increased to 590 HV, as a result of which the product had distortion due to quench cracking, and the life was shortened.

In pipe Nos. 15 and 16, since the S content was excessive as a material or Ca was not contained, MnS-based expanded inclusions were generated, and cracking originating from the inclusions occurred.

Additionally, pipe Nos. 11 to 14 had a hardness of less than 400 HV, which was low in strength, so that the number of durability cycles to fracture in the fatigue test was less than 200,000. However, by setting the Lankford value of the electric resistance welded steel pipe 5 within the range according to aspects of the present invention, the fatigue characteristics thereof were improved as compared with the cases where the Lankford value of the electric resistance welded steel pipe 5 was outside the range according to aspects of the present invention.

As described above, setting the Lankford value of the electric resistance welded steel pipe 5 for manufacturing a hollow stabilizer within the range according to aspects of the present invention enables improvement in bendability and fatigue characteristics of the electric resistance welded steel pipe 5 for manufacturing a hollow stabilizer.

Furthermore, it has been found that by using the electric resistance welded steel pipe 5 for manufacturing a hollow stabilizer to manufacture a hollow stabilizer with a hardness of from 400 HV to less than 580 HV, there can be obtained a high-strength hollow stabilizer excellent in bendability and fatigue characteristics.

The present application claims priority to Japanese Patent Application No. 2018-121799 (filed on Jun. 27, 2018), the entire content of which is incorporated by reference as a part of the present disclosure. Herein, while aspects of the present invention have been described with reference to the limited number of embodiments, the scope of the present invention is not limited thereto. It is apparent that modifications and adaptations to the respective embodiments based on the above disclosure may occur to those skilled in the art.

REFERENCE SIGNS LIST

1: First step
1A: Open pipe forming unit
1B: Electric resistance welding unit
1C: Bead cutting unit
2: Electric resistance welded steel pipe (mother pipe)
3: Second step
3A: Heat treatment unit
3B: Hot diameter reduction rolling unit
5: Electric resistance welded steel pipe (after diameter reduction rolling)
40: Hollow stabilizer
40A: Bent portion

The invention claimed is:

1. An electric resistance welded steel pipe for manufacturing a hollow stabilizer, having a yield ratio (YS/TS) of 0.7 or more, a uniform elongation U-EL of 10% or more, and a Vickers hardness of from 400 HV to less than 580 HV, wherein a Lankford value (r value) in a pipe longitudinal direction is from 0.7 to less than 1.0.

2. The electric resistance welded steel pipe for manufacturing a hollow stabilizer according to claim 1, wherein a steel material forming the steel pipe includes, in terms of % by mass, C: from 0.20% to 0.40%, Si: from 0.1% to 1.0%, Mn: from 0.1% to 2.0%, P: 0.100% or less, S: 0.010% or less, Al: from 0.01% to 0.10%, Cr: from 0.01% to 0.50%, Ti: from 0.01% to 0.05%, B: from 0.0005% to 0.0050%, Ca: from 0.0001% to 0.0050%, and N: 0.0050% or less, with a balance including Fe and inevitable impurities.

3. The electric resistance welded steel pipe for manufacturing a hollow stabilizer according to claim 2, wherein the steel material forming the steel pipe further includes, in terms of % by mass, one or both of Cu: from 0.05% to 1.00% and Ni: from 0.05% to 1.00%.

4. The electric resistance welded steel pipe for manufacturing a hollow stabilizer according to claim 3, wherein the steel material forming the steel pipe further includes, in terms of % by mass, one or more selected from Nb: from 0.001% to 0.050%, W: from 0.001% to 0.050%, and V: from 0.05% to 0.50%.

5. The electric resistance welded steel pipe for manufacturing a hollow stabilizer according to claim 3, wherein the steel material forming the steel pipe further includes, in terms of % by mass, REM: from 0.001% to 0.020%.

6. The electric resistance welded steel pipe for manufacturing a hollow stabilizer according to claim 2, wherein the steel material forming the steel pipe further includes, in terms of % by mass, one or more selected from Nb: from 0.001% to 0.050%, W: from 0.001% to 0.050%, and V: from 0.05% to 0.50%.

7. The electric resistance welded steel pipe for manufacturing a hollow stabilizer according to claim 6, wherein the steel material forming the steel pipe further includes, in terms of % by mass, REM: from 0.001% to 0.020%.

8. Electric resistance welded steel pipe for manufacturing a hollow stabilizer according to claim 2, wherein the steel material forming the steel pipe further includes, in terms of % by mass, REM: from 0.001% to 0.020%.

9. A hollow stabilizer comprising the electric resistance welded steel pipe for manufacturing a hollow stabilizer according to claim 1, having a Vickers hardness of from 400 HV to less than 580 HV.

10. A hollow stabilizer comprising the electric resistance welded steel pipe for manufacturing a hollow stabilizer according to claim 2, having a Vickers hardness of from 400 HV to less than 580 HV.

11. A hollow stabilizer comprising the electric resistance welded steel pipe for manufacturing a hollow stabilizer according to claim 3, having a Vickers hardness of from 400 HV to less than 580 HV.

12. A hollow stabilizer comprising the electric resistance welded steel pipe for manufacturing a hollow stabilizer according to claim 4, having a Vickers hardness of from 400 HV to less than 580 HV.

13. A hollow stabilizer comprising the electric resistance welded steel pipe for manufacturing a hollow stabilizer according to claim 8, having a Vickers hardness of from 400 HV to less than 580 HV.

14. A method for manufacturing a hollow stabilizer comprising: performing cold bending on the electric resistance welded steel pipe for manufacturing a hollow stabilizer according to claim 1; and then performing a heat treatment including quenching and tempering on the steel pipe, wherein the cold bending is cold rotary draw bending, in which a bend radius is from 1.0 times to 3.0 times an outer diameter of the electric resistance welded steel pipe before performing the cold bending, a flattening ratio is from 0% to 10%, a thickness reduction rate on a bending outside and a thickness increase rate on a bending inside are from 0% to 10%, and additionally, a circumferential length change of a bending center portion is from 0% to 10%; and wherein the Vickers hardness after the heat treatment is adjusted to from 400 HV to less than 580 HV.

15. A method for manufacturing a hollow stabilizer comprising: performing cold bending on the electric resistance welded steel pipe for manufacturing a hollow stabilizer according to claim 2; and then performing a heat treatment including quenching and tempering on the steel pipe, wherein the cold bending is cold rotary draw bending, in which a bend radius is from 1.0 times to 3.0 times an outer diameter of the electric resistance welded steel pipe before performing the cold bending, a flattening ratio is from 0% to 10%, a thickness reduction rate on a bending outside and a thickness increase rate on a bending inside are from 0% to 10%, and additionally, a circumferential length change of a bending center portion is from 0% to 10%; and wherein the Vickers hardness after the heat treatment is adjusted to from 400 HV to less than 580 HV.

16. A method for manufacturing the electric resistance welded steel pipe of claim 1, the method comprising:
    a first step of butting widthwise end portions of a steel sheet together and subjecting the end portions to electric resistance welding to obtain an electric resistance welded steel pipe as a mother pipe; and
    a second step of heating the electric resistance welded steel pipe as the mother pipe to a temperature of from 850° C. to 1000° C. and then subjecting the heated steel pipe to hot diameter reduction rolling under conditions of a rolling temperature: from 700° C. to 850° C. and a cumulative diameter reduction rate at an $Ar_3$ transformation point or lower: from 0% to 10%.

17. The method for manufacturing an electric resistance welded steel pipe for manufacturing a hollow stabilizer according to claim 16, wherein the steel sheet includes, in terms of % by mass, C: from 0.20% to 0.40%, Si: from 0.1% to 1.0%, Mn: from 0.1% to 2.0%, P: 0.100% or less, S: 0.010% or less, Al: from 0.01% to 0.10%, Cr: from 0.01% to 0.50%, Ti: from 0.01% to 0.05%, B: from 0.0005% to 0.0050%, Ca: from 0.0001% to 0.0050%, and N: 0.0050% or less, with a balance including Fe and inevitable impurities.

18. The method for manufacturing an electric resistance welded steel pipe for manufacturing a hollow stabilizer according to claim 17, wherein the steel sheet further includes one or more selected from, in terms of % by mass, Cu: from 0.05% to 1.00%, Ni: from 0.05% to 1.00%, Nb: from 0.001% to 0.050%, W: from 0.001% to 0.050%, V: from 0.05% to 0.50%, and REM: from 0.001% to 0.020%.

\* \* \* \* \*